March 27, 1928. 1,663,943
W. L. HAYS
AIR OPERATED POWER GENERATOR
Filed Aug. 14, 1926 2 Sheets-Sheet 1

Inventor
W. L. Hays
By Watson E. Coleman
Attorney

March 27, 1928.
W. L. HAYS
AIR OPERATED POWER GENERATOR
Filed Aug. 14, 1926
1,663,943
2 Sheets-Sheet 2
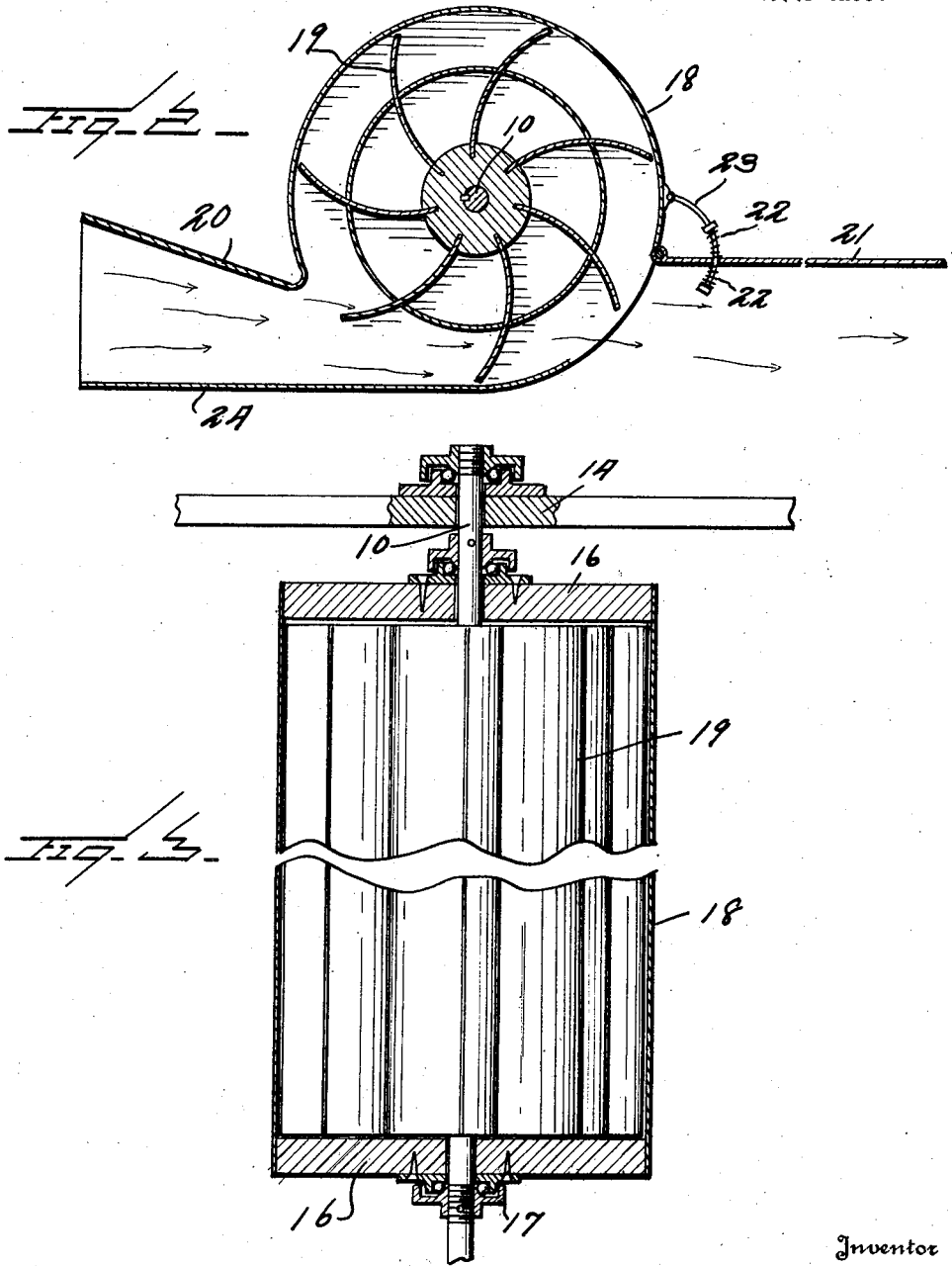
Inventor
W.L.Hays
By Watson E. Coleman
Attorney Patented Mar. 27, 1928.

1,663,943

UNITED STATES PATENT OFFICE.

WILLIAM L. HAYS, OF STERLING, COLORADO.

AIR-OPERATED POWER GENERATOR.

Application filed August 14, 1926. Serial No. 129,201.

This invention relates to the production of power by movement of the wind, and the general object of the invention is to provide means for intercepting any desired volume of moving air and causing all the force thus intercepted to converge and to impinge upon points alongside of a perpendicular rotating shaft, all of which points are practically equidistant from the axis of the shaft and to provide means for conserving for the generating of mechanical power all the force or power in the volume of moving air intercepted and to eliminate the waste of energy present in the operation of all ordinary windmills.

In the ordinary windmill in use, the wheel generating the motion and power thereof does not really conserve the motion of the air-current intercepted. In fact it does not intercept the power of such air-current as impinges against the wheel at all. The air-current strikes obliquely against the fans of the wheel and instead of the motion of the air-current being conserved and utilized and converted into power, whenever great force is required to move the connecting machinery, by far the greater part of such power is carried off between the fans with the escaping and moving air-current.

Then in the usual windmill the air-current, whatever its velocity, strikes with equal power on all points of the radii of the wheel, so that at the points near the outer extremity of the radii the power of the air-current would raise many pounds, while the same power of the air current striking nearer the center of the wheel would raise fewer pounds, so that the power of the intercepted air-current has lost much of its efficiency by not being concentrated at points equally distant from the center of the axis of the wheel. Then if there are points on the radii of the ordinary windmill circumscribing the center of the wheel, which move as fast as the wind current, then all the points between this circumscribing circle and the outer rim of the wheel, move faster than the points on this circle and by thus beating against the wind, impede and check the power generated by the wheel.

By providing means for confining, utilizing and converging all the power in the air-current intercepted so that there may be no leakage between fans, vanes or otherwise, I utilize all the power of the air-current intercepted, and by converging the intercepted air-current and confining it so that all its power and motion must impinge against the blades attached to the rotating shaft, I apply all the power upon points practically equidistant, from the axis of the shaft and not only generate the utmost possible power from the air-current but avoid any waste thereof and avoid the possibility of any part of the power generated interfering with or neutralizing any other power or motion generated, and thus secure the full power from the wind without any retarding action.

A further object is to provide a device of this character which is particularly adapted for the generation of electric power, though it may be used for other purposes.

My invention is illustrated in the accompanying drawings wherein:—

Figure 2 is a section on the line 2—2 of Figure 1;

Figure 3 is a vertical section through the generator.

Figure 1:
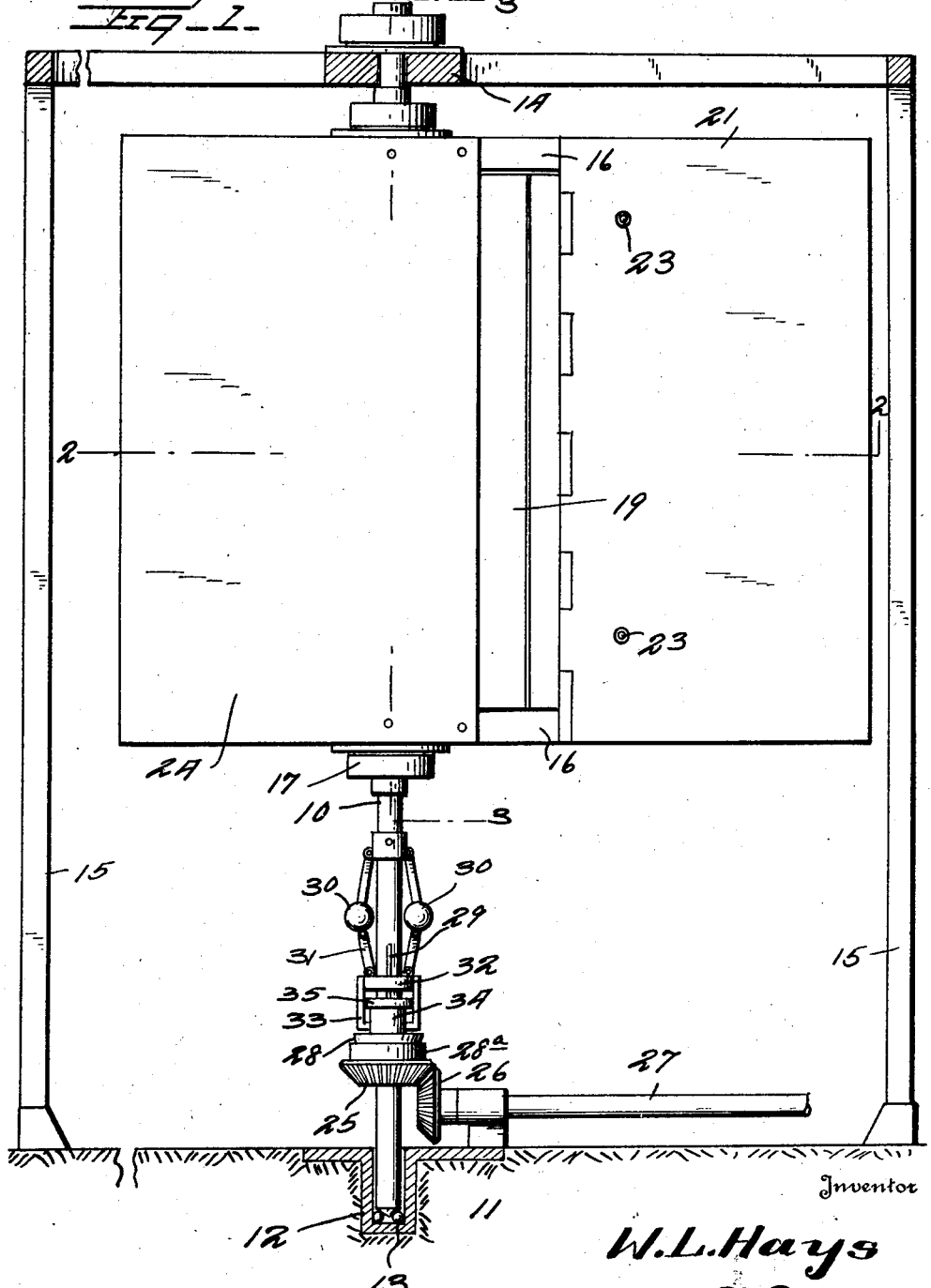
Figure 1 is an elevation of my power generator, the supporting frame being in section.

Referring to these drawings it will be seen that the generator consists of a shaft 10 which, at its lower end, is supported on a concrete base 11, preferably disposed within a socket 12 having anti-friction thrust bearings 13. This shaft 10 may be supported at its upper end by means of a supporting frame having horizontal beams 14, through which the shaft passes, this shaft being in turn supported by vertical members 15 but I do not wish to be limited to this, however, as the shaft may extend down sufficiently into the base as to secure proper support without the necessity of using a supporting frame.

The shaft 10 passes through upper and lower disks 16 which are supported upon the shaft by ball bearings or like anti-friction devices 17. These disks 16 carry upon them a housing formed to provide, as illustrated in Figure 2, a wall 18 which extends somewhat more than half way around the blades 19, carried by the shaft 10, this wall or housing section 18 at one end being formed with an outwardly and laterally inclined portion 20 and at the other end carrying, mounted upon it or integrally connected to it, the vane 21, which acts to turn the inlet passage of the housing into the wind. As illustrated, this vane 21 is hingedly mounted upon the extremity of the wall 18 and is held in normal or medial position by a coil compression spring 22 mounted upon an arcuate rod or support 23 extending outward from the wall 18, passing through an opening in the vane 21. This spring 22 will act to hold the vane in its middle position against ordinary wind force but the springs will yield to prevent breaking of the vane or too sudden movement of the housing when the wind pressure suddenly increases.

The housing is also formed to provide a wall or housing section 24 which is attached to the disks and intersects these disks at a tangent, this wall 24 extending outward in divergent relation to the wall 20, as shown in Figure 2.

It will be obvious now that any wind blowing in the direction of the arrow in Figure 2, will be directed by the portions 20 and 24 of the housing inward so as to strike a middle portion of a blade 19 between the outer extremity of the blade and the inner extremity thereof at a point substantially equal to the main width of the blade. Thus, all of the force of the wind will be caused to impinge against the middle of the blade as distinguished from the extreme ends thereof, inasmuch as it is this portion of the blade which travels at the same speed as the wind.

In Figure 1 I have illustrated the manner in which the shaft 10 may be connected up to deliver power and yet be automatically disconnected from the device to stop its delivering power when the force of the wind exceeds a certain amount. To this end the shaft 10 carries loose upon it the beveled gear wheel 25 which engages with the beveled gear wheel 26 on a shaft 27 whereby power may be delivered to any suitable mechanism. The gear wheel 25 is loose on the shaft 10 but is connected therewith by any suitable clutch. I have illustrated for this purpose a friction clutch 28 slidingly mounted upon the shaft 10 but caused to rotate with the shaft by means of a spline 29. Mounted upon the shaft is a governor including governor balls 30 and the links 31 which are operatively connected to the clutch 27. As the shaft rotates the balls 30 will be drawn outward. The links 31 are connected to a disk 32 having fingers 33 which extend downward and then inward while the clutch 28 is provided with a hub 34 having a flange 35, against which the inwardly turned extremities of the fingers 33 will engage when the balls 30 are drawn out beyond a predetermined point. Thus under normal circumstances while the governor will revolve and the balls will be thrown outward, there will be no disengagement of the clutch member 28 from the corresponding clutch member 28ª associated with the gear wheel 25. When, however, very high wind arises which would be likely to break the machinery or drive it at too high speed, the clutch will be withdrawn, and while the blades or vanes 19 will revolve with the shaft, no revolution will be communicated to the shaft 27.

The shaft 27 is designed to be engaged with electric generators of any suitable type to thereby cause electricity to be generated by the force of the wind.

I claim:—

1. An air current power generator comprising a vertically disposed shaft journaled for rotation, a series of substantially radially disposed blades carried by the shaft, a cylindrical casing journaled upon the shaft and housing the series of blades, the said casing being provided at one side with a funnel shaped air inlet opening and at an opposite side portion with an air exit opening, and a vertically disposed vane hinged to the casing eccentrically thereof and at that edge of the air exit opening which is the more remote from the air inlet opening.

2. An air current power generator comprising a vertically disposed shaft journaled for rotation, a series of substantially radially disposed blades carried by the shaft, a cylindrical casing journaled upon the shaft and housing the series of blades, the said casing being provided at one side with a funnel shaped air inlet opening and at an opposite side portion with an air exit opening, a vertically disposed vane hinged to the casing eccentrically thereof and at that edge of the air exit opening which is the more remote from the air inlet opening, and compression springs supported upon the casing and bearing at their inner ends against the opposite sides of the vane.

In testimony whereof I hereunto affix my signature.

WILLIAM L. HAYS.